US008504722B2

(12) United States Patent
Haddad

(10) Patent No.: US 8,504,722 B2
(45) Date of Patent: Aug. 6, 2013

(54) ENHANCING DS-LITE WITH PRIVATE IPV4 REACHABILITY

(75) Inventor: Wassim Haddad, San Jose, CA (US)

(73) Assignee: Telefonaktiebolaget LM Ericsson, Stockholm (SE)

( * ) Notice: Subject to any disclaimer, the term of this patent is extended or adjusted under 35 U.S.C. 154(b) by 149 days.

(21) Appl. No.: 12/815,257

(22) Filed: Jun. 14, 2010

(65) Prior Publication Data
US 2011/0307629 A1 Dec. 15, 2011

(51) Int. Cl.
G06F 15/16 (2006.01)
G06F 15/173 (2006.01)

(52) U.S. Cl.
USPC ............ 709/245; 709/224; 709/230; 709/246

(58) Field of Classification Search
USPC .......................................................... 709/245
See application file for complete search history.

(56) References Cited

U.S. PATENT DOCUMENTS

| 7,245,622 | B2* | 7/2007 | Huitema | 370/392 |
|---|---|---|---|---|
| 7,315,543 | B2* | 1/2008 | Takeuchi et al. | 370/392 |
| 7,526,562 | B1* | 4/2009 | Samprathi et al. | 709/230 |
| 7,573,903 | B2* | 8/2009 | Miyata et al. | 370/466 |
| 7,764,686 | B1* | 7/2010 | Toebes et al. | 370/392 |
| 7,924,832 | B2* | 4/2011 | Li et al. | 370/389 |
| 8,046,452 | B2* | 10/2011 | Hovell et al. | 709/224 |
| 2004/0153502 | A1 | 8/2004 | Jiang | |
| 2004/0165602 | A1 | 8/2004 | Park et al. | |
| 2004/0190549 | A1* | 9/2004 | Huitema | 370/466 |
| 2005/0083969 | A1 | 4/2005 | Lee et al. | |
| 2006/0015647 | A1* | 1/2006 | Kang et al. | 709/245 |
| 2006/0062248 | A1 | 3/2006 | Huang et al. | |
| 2006/0259641 | A1* | 11/2006 | Kim et al. | 709/245 |
| 2006/0259969 | A1 | 11/2006 | Suh et al. | |
| 2007/0088853 | A1 | 4/2007 | Lee et al. | |
| 2008/0114898 | A1 | 5/2008 | Takeda et al. | |
| 2008/0273509 | A1 | 11/2008 | Li | |
| 2010/0220738 | A1 | 9/2010 | Sarikaya | |
| 2011/0038377 | A1 | 2/2011 | Haddad | |
| 2011/0208877 | A1 | 8/2011 | Ikeda et al. | |
| 2011/0211558 | A1 | 9/2011 | Ikeda et al. | |
| 2011/0292850 | A1 | 12/2011 | Oishi et al. | |
| 2012/0066695 | A1 | 3/2012 | Berezansky et al. | |
| 2012/0259998 | A1 | 10/2012 | Kaufman | |

OTHER PUBLICATIONS

Bagnulo, *NAT64: Network Address and Protocol Translation from IPv6 Clients to IPv4 Servers*; draft-bagnulo-behave-nat64-03.txt, No. 3. Mar. 7, 2009, 28 pages.

(Continued)

*Primary Examiner* — Richard G Keehn
(74) *Attorney, Agent, or Firm* — Blakely, Sokoloff, Taylor & Zafman

(57) ABSTRACT

A method implemented in a network element to make a first device assigned an IPv4 private address accessible to a second device using Internet Protocol Version 6 (IPv6), the method comprising receiving an IPv6 formatted data packet, having a virtual IPv6 address as a destination address and having been sent from the second device; determining whether the virtual IPv6 address includes a representation prefix (RP); sending an address map query (AMQ) to a customer premise equipment (CPE), where the CPE stores a mapping between the virtual IPv6 address and a private IPv4 address of the first device; receiving an address map response (AMR) from the CPE with the private IPv4 address corresponding to the virtual IPv6 address; translating the IPv6 formatted data packet into an IPv4 formatted data packet; and sending the translated data packet to the CPE through an IPv4 over IPv6 tunnel.

10 Claims, 5 Drawing Sheets

OTHER PUBLICATIONS

Bagnulo, *DNS64: DNS extensions for Network Address Translation from IPv6 Clients to IPv4 Servers* draft-ietf-behave-dns64-00, Jul. 4, 2009, 26 pages.

Durand, A., "Dual-stack lite broadband deployments post IPv4 exhaustion draft-ietf-software-dual-lite-03", *Internet Engineering Task Force*; Internet Draft; Feb. 3, 2010; 37 pages.

Johnson, D., et al., "Mobility Support in IPv6 draft-ietf-mext-rfc3775bis-04.text", *IETF Mobile IP Workin Group*; Jul. 13. 2009; 176 pages.

Non-Final Office Action, U.S. Appl. No. 12/819,074, dated Aug. 20, 2012, 13 pages.

Non-Final Office Action, U.S. Appl. No. 12/850,488, dated Aug. 29, 2012, 14 pages.

Non Final Office Action, U.S. Appl. No. 12/850,488, dated Aug. 29, 2012, 10 pages.

Bangulo, et al., "Stateful NAT64: Network Address and Protocol Translation from IPv6 Clients to IPv4 Servers draft-ietf-behave-v6v4-xlate-stateful-08", *IETF*, Jan. 2010.

Soliman, H., "Mobile IPv6 Support for Dual Stack Hosts and Routers", *RFC 5555*, Jun. 2009.

Non-Final Office Action, U.S. Appl. No. 12/819,074, dated Jan. 25, 2013, 8 pages.

Notice of Allowance, U.S. Appl. No. 12/850,488, dated Feb. 25, 2013, 9 pages.

\* cited by examiner

ENHANCING DS-LITE WITH PRIVATE IPV4 REACHABILITY

FIELD OF THE INVENTION

Embodiments of the present invention relate to a method of providing access to an end user device having a private Internet Protocol version 4 (IPv4) address. Specifically, the embodiments of the invention relate to a method and a system for providing accessibility to end user devices with an private IPv4 address to devices using Internet Protocol version 6 (IPv6).

BACKGROUND

DS-Lite is an IPv4 to IPv6 protocol transition mechanism that is adapted to a broadband service provider infrastructure. DS-Lite provides a bridge between the two protocols and offers an evolutionary path for the Internet to deal with the Internet Address Numbers Authority (IANA) IPv4 address depletion. The IANA IPv4 address depletion is caused by limits in the addressing of IPv4. IPv4 utilizes 32 bit addresses. This limits the total address space to $2^{32}$ addresses for IPv4. Network address translation (NAT) has been utilized to ameliorate the IANA IPv4 address depletion by the creation of private IPv4 address that are utilized only within specific networks. However, as a result the IPv4 addresses of many end devices are not visible to devices communicating with those devices. Instead an address of the device implementing the NAT is utilized in place of the private IPv4 traffic outside of the network of the device using the private IPv4 address. This introduces a layer of indirection and complexity to the Internet and breaks the original design of direct end to end communication between devices on the Internet.

DS-Lite protocol enables broadband service providers to share IPv4 addresses among customers by combining two well-known technologies: IPv4-in-IPv6 tunneling and NAT. With this combination, DS-Lite enables a transition to the use of IPv6 links between the service provider network and customer premise equipment (CPE). This decouples the deployment of IPv6 in the Internet service provider network (up to the CPE) from the development of IPv6 in the global Internet and in customer applications and devices. Consequently, the IPv4-enabled end user devices are not impacted by the transition from IPv4 to IPv6 by their Internet service provider and can continue using IPv4 addresses, primarily private ones, as is the current situation, allowing for gradual transition to IPv6.

The key elements in DS-Lite technology are an IPv4-in-IPv6 tunnel, which is established between a CPE and the DS-Lite carrier grade Address Family Transition Router Element (AFTR) or large scale NAT (LSN), which plays the role of a central evolved NAT64 node. A key characteristic of the DS-Lite approach is that communications between end-nodes stay within their address family, i.e., IPv6 sources only communicate with IPv6 destinations and IPv4 sources communicate only with IPv4 destinations. There is no protocol family translation involved in a DS-Lite approach.

As the deployment of Ipv6 gains speed and scope, it is expected that many access networks will provide IPv6 connectivity to end-nodes. Such transition will be largely enabled by the deployment of NAT64 technology, which will allow communication between the IPv6-enabled node and an IPv4 destination. However, DS-Lite does not provide end-to-end visibility between IPv6 end user devices and IPv4 end user devices where the IPv4 end user device is assigned a private IPv4 address.

SUMMARY

A method implemented in a network element to make a first device using Internet Protocol Version 4 (IPv4) and assigned an IPv4 private address accessible to a second device using Internet Protocol Version 6 (IPv6), the method comprising the steps of: receiving an IPv6 formatted data packet, having a virtual IPv6 address as a destination address and having been sent from the second device; determining whether the virtual IPv6 address includes a representation prefix (RP), wherein the RP indicates that the virtual IPv6 address is a virtual address; sending an address map query (AMQ) to a customer premise equipment (CPE), wherein the AMQ includes the virtual IPv6 address, wherein the CPE stores a mapping between the virtual IPv6 address and a private IPv4 address of the first device, and wherein the CPE is connected to the first device; receiving an address map response (AMR) from the CPE with the private IPv4 address corresponding to the virtual IPv6 address; translating the IPv6 formatted data packet into an IPv4 formatted data packet having a source address that is an address of the network element and having the private IPv4 address in place of the virtual IPv6 address as the destination address; and sending the translated data packet to the CPE through an IPv4 over IPv6 tunnel, whereby the network element translates the data packet with assistance from the CPE and without implementing a domain name server 64 in the network.

A network element implemented to make an Internet Protocol Version 4 (IPv4) device that uses IPv4 and that is assigned a private IPv4 address accessible to an Internet Protocol Version 6 (IPv6) device that uses IPv6 and that is assigned a regular IPv6 address, wherein the format of the source and destination addresses of IPv4 formatted data packets and IPv6 formatted data packets are different, the network element comprising: a plurality of ports configured to be coupled to the IPv6 device and coupled to a customer premise equipment (CPE) to which the IPv4 device is connected; and a light network address translation (NAT) module configured to translate IPv6 formatted data packets, which are being sent from the IPv6 device to the IPv4 device and have as their source address the regular IPv6 address, into IPv4 formatted data packets, the light NAT module comprising: a detection module configured to detect that a virtual IPv6 address including a representation prefix (RP) is used as the destination address of the IPv6 formatted data packets, a communication module configured to discover a correspondence of the virtual IPv6 address with the private IPv4 address through an addressing map query (AMQ) and an address map response (AMR) exchange with the customer premise equipment (CPE), and a translation module, responsive to the discovered correspondence, configured to generate the IPv4 formatted data packets from the IPv6 formatted data packets, wherein the IPv4 formatted data packets have as their source address an IPv4 address of the network element in place of the IPv6 device's regular IPv6 address and have as their destination address the IPv4 device's private IPv4 address in place of the IPv4 device's virtual IPv6 address, and wherein the light NAT is further configured to send the IPv4 formatted data packets to the CPE through an IPv4 over IPv6 tunnel for forwarding to the IPv4 device, whereby the light NAT module is capable of translating the data packets with assistance from the CPE and without implementing a domain name server 64.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, is understood that embodiments of the invention may be practiced without these specific details. In other instances, well-known circuits, structures and techniques have not been shown in detail in order not to obscure the understanding of this description. It will be appreciated, however, by one skilled in the art, that the invention can be practiced without such specific details. Those of ordinary skill in the art, with the included descriptions, will be able to implement appropriate functionality without undue experimentation.

Figure 1:
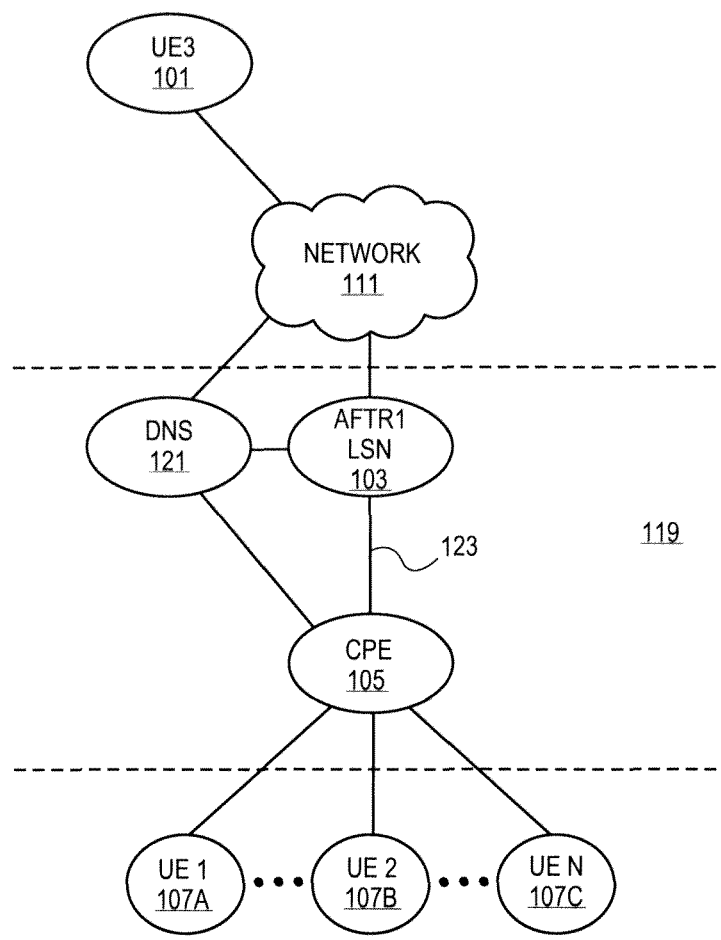
FIG. 1 is a diagram of one embodiment of a network implementing enhanced DS-Light with private IPv4 reachability.

The operations of the flow diagrams will be described with reference to the exemplary embodiment of FIGS. 1, 2A and 2B. However, it should be understood that the operations of flow diagrams can be performed by embodiments of the invention other than those discussed with reference to FIGS. 1, 2A and 2B, and the embodiments discussed with reference to FIGS. 1, 2A and 2B can perform operations different than those discussed with reference to the flow diagrams of FIG. 3-6.

The techniques shown in the figures can be implemented using code and data stored and executed on one or more electronic devices (e.g., a host, a router, a network element, etc.). Such electronic devices store and communicate (internally and/or with other electronic devices over a network) code and data using non-transitory tangible machine-readable or computer-readable media, such as non-transitory tangible machine-readable or computer-readable storage media (e.g., magnetic disks, optical disks, random access memory, read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage device and signals carrying the network traffic respectively represent one or more non-transitory tangible machine-readable or computer-readable storage media and non-transitory tangible machine-readable or computer-readable communication media. Thus, the storage device of a given electronic device typically stores code and/or data for execution on the set of one or more processors of that electronic device. Of course, one or more parts of an embodiment of the invention can be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video). Subscriber end stations (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc.), corporate networks over VPNs, IPTV, etc. Typically, subscriber end stations are coupled (e.g., through customer premise equipment coupled to an access network (wired or wirelessly) to edge network elements, which are coupled (e.g., through one or more core network elements to other edge network elements) to other end stations (e.g., server end stations).

The embodiments of the present invention provide a system, network and method for avoiding the disadvantages of the prior art including: the inability of Internet Protocol version 6 (IPv6) end user devices outside of an access network to reach Internet Protocol version 4 (IPv4) end user devices that have private IPv4 addresses, where 'reach,' as used herein refers to the ability of the IPv6 end user device to obtain an address for specific to the IPv4 end user device, instead of an address for a network address translation (NAT) device in the access network of the IPv4 end user device without having to implement a domain name service 64.

The embodiments of the invention overcome these disadvantages by having the customer premise equipment assign virtual IPv6 addresses to each of the private IPv4 end user devices attached to the customer premise equipment. When data traffic is received at the Address Family Transition Router Element (AFTR) implementing the large scale NAT (LSN) the IPv6 data traffic is analyzed to detect the use of a representation prefix (RP). In response to detecting the RP an address map query (AMQ) message is sent to the customer premise equipment (CPE) with the IPv6 destination address of the data traffic. The CPE responds with an address map response (AMR) message that includes the corresponding private IPv4 address. The LSN then translates the data traffic to IPv4 and forwards it to the CPE through an IPv4 over IPv6 tunnel where it is forwarded to the end user device with the private IPv4 address. This process enables an IPv6 end user device to reach the IPv4 end user device through an IPv6 address specific to the IPv4 end user device, without having to implement a DNS 64 in the access network of the IPv4 end user device.

FIG. 1A is a diagram of one embodiment of a network implementing the IPv4 reachability for end user devices. The network includes an access network 119 such as an Internet service provider network including an AFTR implementing a large scale NAT 103 and premise equipment 105 providing Internet service to a set of end user devices 107A-107C. These devices are connected through the large scale NAT 103 to an intermediate network 111 and any number of end user devices 101 or similar devices on the network. The access network 119 also includes a domain name server (DNS) 124 that may implement IPv4 and/or IPv6, but does not implement DNS 64, which maps IPv4 address to IPv6 addresses.

The end user devices 107A-107C can be any type of computing devices including personal computers, laptops, handheld devices, console devices and similar computing devices. The end user devices 107A-107C utilize IPv4. IPv4 uses a 32 bit address scheme. Due to the coming exhaustion of IPv4 addresses with the Internet Address Number Authority, end user devices 107A-107C are given private IPv4 addresses that are valid only within the access network 119.

Each of the end user devices 107A-107C are connected to the access network 119 through CPE 105. CPE 105 can be any type of network device, router, authentication server or similar device that provides Internet access to the end user devices. The CPE 105 can be responsible for providing the private IPv4 addresses to each of the end user devices 107A-107C. In addition, the CPE 105 generates a separate virtual IPv6 address that has a one-to-one relationship with each of the respective IPv4 addresses of the end user devices 107A-107C. This assignment of the virtual IPv6 address to each end user device 107A-107C is transparent to the end user devices 107A-107C, but provides a means by which the end user devices can be known outside the access network 119 to IPv6 end user devices 101.

The CPE 105 is connected by the access network 119 to the large scale NAT 103 and the DNS 121. The large scale NAT 103 is responsible for general translation of private addresses to public addresses that enable the external end user devices 101, i.e., those end user devices 101 outside the access network 119 to communicate with the end user devices 107A-107C and other devices of the access network that use private addresses. In one embodiment, the LSN 103 implements a light NAT64 to provide reachability to the end user devices 107A-107C using private IPv4 addresses within the access network 119 to external devices using IPv6 such as a end user device 101.

The access network 119 can by any type of network including a local area network, a wide area network or similar communication system. The access network 119 can also include a DNS device 121 that provides DNS services for IPv4 and/or IPv6 for all the devices within the access network 119, but that doesn't provide DNS64 services. The access network 119 can include any number of end user devices 107A-107C and can be connected to any number of other networks including network 111.

The network 111, which connects the end user device 101 with the access network 119, can be any type of network including a wide area network (e.g., the Internet), local area network or similar network. Any number of external devices can be accessed through to the network 111 such as servers, databases and end user devices 101. In one example embodiment, the end user device 101 can be a mobile handset or similar device that runs IPv6 natively, which can communicate with the end user devices 107A-107C. The communication is facilitated by the light NAT64 and the LSN device 103, which provides reachability to the end user devices 107A-107C in conjunction with the DNS device 121. Since the end user devices each have virtual IPv6 addresses, they can be found by the IPv6 end user device 101 through DNS.

Figure 2A:
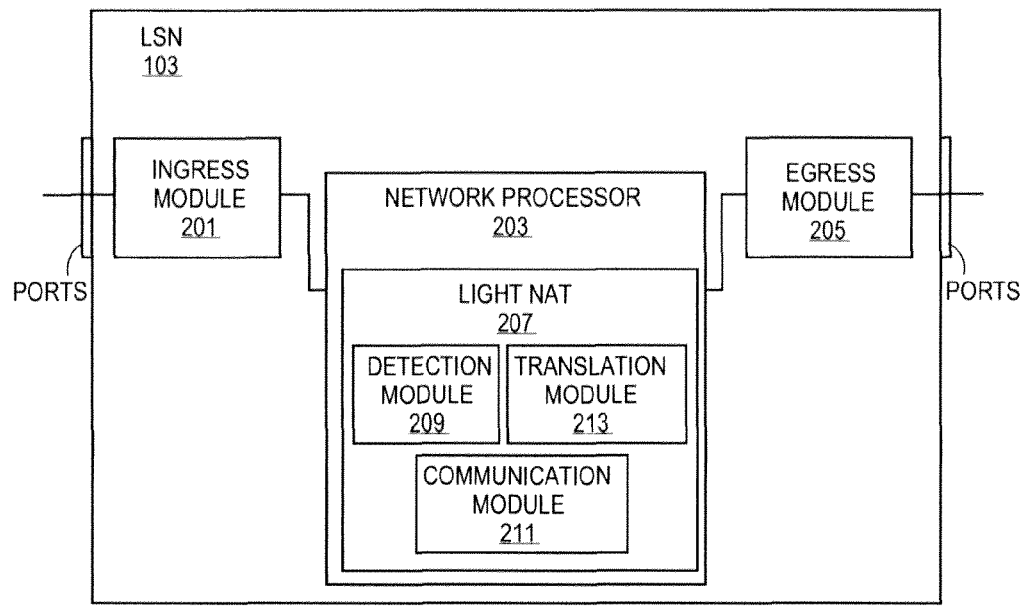
FIG. 2A is a diagram of one embodiment of a network element implementing a light network address translation module.

FIG. 2A is a diagram of one embodiment of a large scale NAT 103. The large scale NAT 103 can include an ingress module 201, an egress module 205 and a network processor 203. The ingress module 201 can process inbound traffic and egress module 205 can process outbound traffic. The ingress module 201 and egress module 205 can process the data traffic at the physical link and data link layers. The network processor 203 can process the data traffic as needed at higher levels. The network processor 203 can implement a light NAT64 207. The light NAT64 207 is light in the sense that it does not require the implementation of a DNS 64 to generate virtual IPv6 addresses. The operation of the light NAT64 is described below in regard to FIGS. 3 and 6.

In one embodiment, the functionality of the light NAT64 is implemented through a set of sub-modules including a detection module 209, a translation module 213 and a communication module 211. The detection module 209 detects that a virtual IPv6 address includes a representation prefix (RP) when used as the destination address of IPv6 formatted data packets. The communication module 211 discovers a correspondence of the virtual IPv6 address with the private IPv4 address through an addressing map query (AMQ) and an address map response (AMR) exchange with the customer premise equipment (CPE). The translation module 213, responsive to the discovered correspondence, generates the IPv4 formatted data packets from the IPv6 formatted data packets, where the IPv4 formatted data packets have as their source address an IPv4 address of the network element in place of the IPv6 device's regular IPv6 address and have as their destination address the IPv4 device's private IPv4 address in place of the IPv4 device's virtual IPv6 address, and wherein the light NAT is further configured to send the IPv4 formatted data packets to the CPE through an IPv4 over IPv6 tunnel for forwarding to the IPv4 device. The light NAT module is capable of translating the data packets with assistance from the CPE and without implementing a domain name server 64.

Figure 2B:
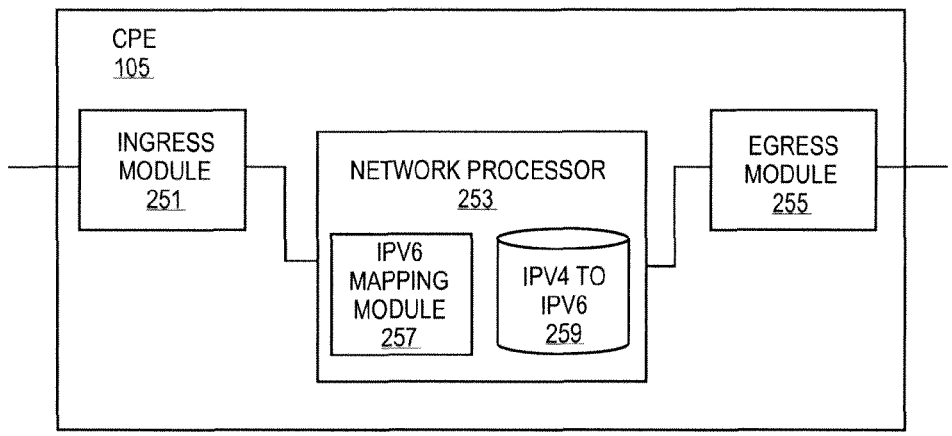
FIG. 2B is a diagram of one embodiment of a network element serving as a customer premise equipment.

FIG. 2B is a diagram of one embodiment of the customer premise equipment (CPE). The CPE 105 includes an ingress module 251, an egress module 255 and a network processor 253. The ingress module 251 processes the data link layer and physical layer of the inbound data traffic. The egress module 255 processes the data link layer and physical layer of the outbound data traffic. The network processor 253 handles higher level processing of the data traffic including the implementation of the IPv6 mapping module 257 and an IPv4 to IPv6 mapping data cache 259.

The IPv6 mapping module 257 generates virtual IPv6 addresses for end user devices connected to the CPE 105 and stores the mappings of the private IPv4 addresses of the end user devices to the virtual IPv6 addresses in the mapping data cache 259. The IPv6 mapping module also services AMQ messages, performs a look-up in the mapping data cache 259 using the virtual IPv6 address in the AMQ message and returns an AMR message to the LSN device. The operation of the CPE 105 is further described below in regard to FIGS. 4 and 5.

Figure 3:
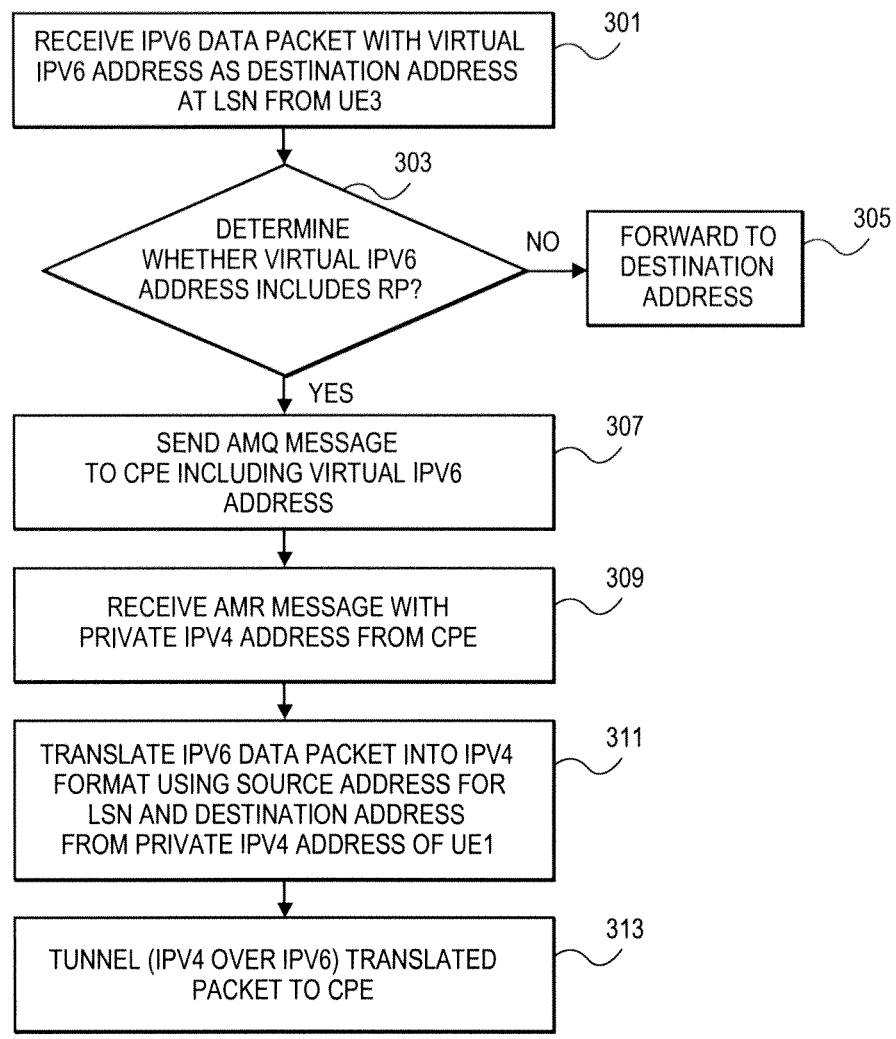
FIG. 3 is a flowchart of one embodiment of a process for handling IPv6 traffic received from an end user device external to an access network that is addressed to an IPv4 end user device having a private IPv4 address.

FIG. 3 is a diagram of one embodiment of the process for handling inbound traffic destined for an end user device with a private IPv4 address. The process is performed by the light NAT64 at the LSN device. The process can be initiated by the reception of an IPv6 data packet with an IPv6 destination address at the LSN from any device exterior to the access network such as the end user device (Block 301). The data packet is examined to determine whether the destination address is a virtual IPv6 device, by determining whether it includes a representative prefix (RP) (Block 303). If the IPv6 destination address includes the RP, then the LSN device knows that it is a virtual IPv6 address that corresponds to a private IPv4 address of an end user device in the access network.

The representative prefix is an address range or identifier within the destination address that indicates that the destination address corresponds to a private IPv4 address. Any range of addresses can be utilized as RP including any set of upper level 64 bit values or larger values and corresponding addresses. A 'set,' as used herein can be any positive whole number of items including one item. If the destination address does not include an RP, then the data packet is forwarded to its destination address (Block 305).

If the destination address does include a representative prefix, then an AMQ message is generated and sent to the CPE (Block 307). The AMQ message includes the virtual IPv6 address from the destination address field of the data packet being processed by the LSN device. The receipt of the AMQ message at the CPE initiates the look-up of the private IPv4 address corresponding virtual IPv6 address at the CPE. In response to the AMQ message, the light NAT64 of the LSN receives an AMR message with the private IPv4 address corresponding to the destination address of the data packet being processed (Block 309). The light NAT64 then translates the data packet information into an IPv4 packet format using the LSN address as the source address and the private IPv4 address as a destination address for the translated data packet (Block 311). The source address of the LSN is utilized so that traffic returned from the end user device corresponding to the private IPv4 address, will come through the LSN to be translated to the IPv6 format before being sent to the ultimate address (e.g., the IPv6 address of an external end user device).

The translated IPv4 data packet is then tunneled using IPv4 over IPv6 tunneling to the CPE. The translated IPv4 data packet is tunneled to the CPE, because the access network is an IPv6 network and unable to process the IPv4 data packet (Block 313). In some embodiments, the light NAT64 stores the mapping of the private IPv4 address and virtual IPv6 address to be utilized for subsequent data traffic processing.

Figure 4:
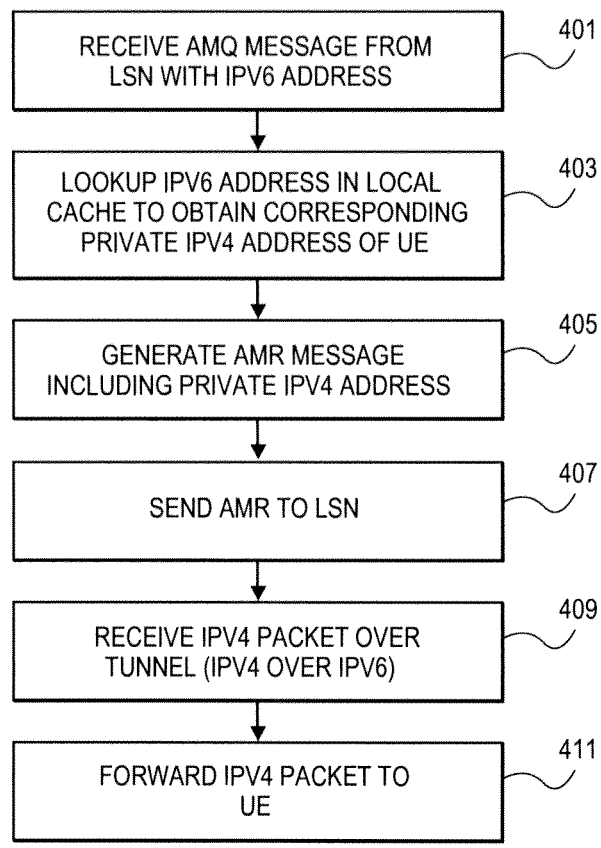
FIG. 4 is a flowchart of one embodiment of a process for the handling of the IPv6 traffic at the customer premise equipment destined for an end user device having a private IPv4 address.

FIG. 4 is a diagram of one embodiment of a process for handling the inbound or downstream data traffic at the CPE. In one embodiment, this process is initiated by reception of an AMQ message from an LSN including a virtual IPv6 address at the CPE (Block 401). The CPE, specifically the IPv6 mapping module, then looks-up the virtual IPv6 address in the local IPv4 to IPv6 mapping cache to obtain a corresponding private IPv4 address. The private IPv4 address is assigned to a user end device that is connected to the CPE (Block 403). The CPE then generates an AMR message including the private IPv4 address (Block 405). The AMR message is then sent across the access network to the LSN (Block 407).

Subsequently, the CPE will receive the translated IPv4 data packet from the LSN through an IPv4 over IPv6 tunnel (Block 409). The CPE then forwards the IPv4 packet to the corresponding user end device (Block 411).

Figure 5:
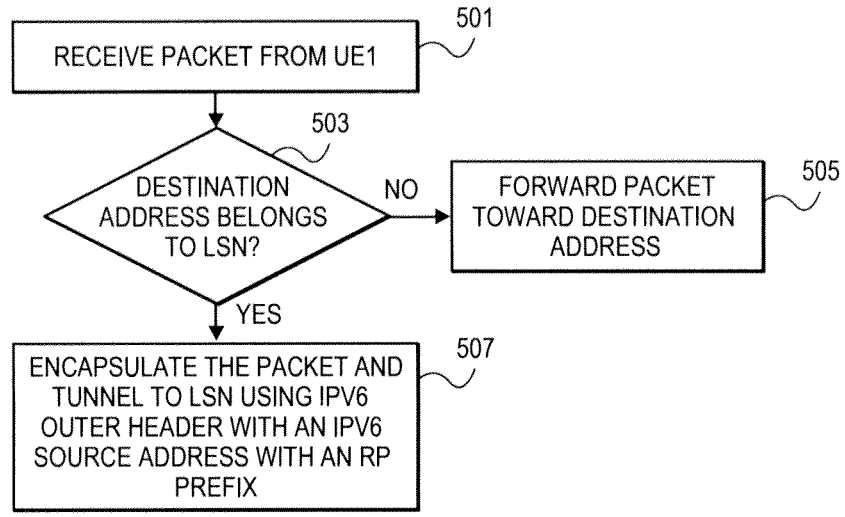
FIG. 5 is a flowchart of one embodiment of a process for processing data traffic from an end user device having a private IPv4 address at the customer premise equipment.

FIG. 5 is a flowchart of one embodiment of a process for handling upstream data traffic at the CPE. This process can be initiated by receiving a data packet from an IPv4 user end device connected to the CPE (Block 501). The CPE then checks the destination address of the data packet to determine whether it belongs to the LSN (Block 503). The address or addresses of the LSN can be known to the CPE through any manual configuration or automated distribution process. In one embodiment, the destination address can be known to belong to the LSN, because the destination falls within a range reserved for the LSN device or through a similar mechanism. If the destination address does not belong to the LSN device, then the data packet is forwarded towards the destination address (Block 505).

However, if the destination address does belong to the LSN device, then the IPv4 packet is encapsulated and tunneled (i.e., in an IPv4 over IPv6 tunnel) to the LSN device using an IPv6 outer header using the private IPv4 address as the source address by adding the representative prefix the private IPv4 address (Block 507).

Figure 6:
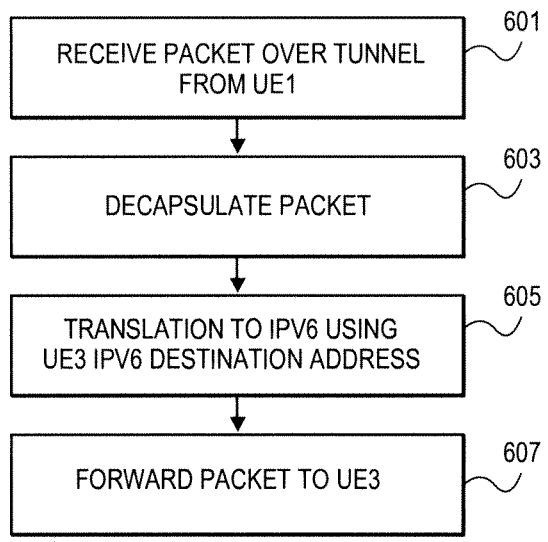
FIG. 6 is a flowchart of one embodiment of a process for handling the data traffic from the end user device having a private IPv4 address at the large scale network address translated (LSN) device.

FIG. 6 is flowchart of one embodiment of a process for handling the upstream traffic the IPv4 end user device at the LSN device. The process is initiated at the LSN device when an IPv4 data packet is received over the tunnel from the IPv4 end user device via the CPE (Block 601). This IPv4 data packet is encapsulated in an IPv6 outer header. The LSN device, specifically the light NAT64, decapsulates the IPv4 data packet (Block 603). The LSN device then translates the IPv4 data packet to an IPv6 formatted data packet using the actual IPv6 destination address of the external end user device (Block 605). The external end user device address can be determined using a mapping of external end user device sessions with virtual IPv6 address in the access network, through a DNS look-up or through a similar mechanism. The translated IPv6 data packet is then forwarded to the end user device of an external network (Block 607).

Thus, a method, system and apparatus for DS-Lite with private IPv4 reachability has been described. It is to be understood that the above description is intended to be illustrative and not restrictive. Many other embodiments will be apparent to those of skill in the art upon reading and understanding the above description. The scope of the invention should therefore be determined with reference to the appended claims, along with the full scope of equivalence to which such claims are entitled.

What is claimed is:

1. A method implemented in a network element to make a first device using Internet Protocol Version 4 (IPv4) and assigned an IPv4 private address accessible to a second device using Internet Protocol Version 6 (IPv6), the method comprising the steps of:

receiving by the network element an IPv6 formatted data packet, having a virtual IPv6 address as a destination address and having been sent from the second device;

determining by the network element whether the virtual IPv6 address includes a representation prefix (RP), wherein the RP indicates that the virtual IPv6 address is a virtual address;

sending by the network element an address map query (AMQ) to a customer premise equipment (CPE), wherein the AMQ includes the virtual IPv6 address, wherein the CPE stores a mapping between the virtual IPv6 address and a private IPv4 address of the first device, and wherein the CPE is connected to the first device;

receiving by the network element an address map response (AMR) from the CPE with the private IPv4 address corresponding to the virtual IPv6 address;

translating by the network element the IPv6 formatted data packet into an IPv4 formatted data packet having a source address that is an address of the network element and having the private IPv4 address in place of the virtual IPv6 address as the destination address; and sending by the network element the IPv4 formatted data packet to the CPE through an IPv4 over IPv6 tunnel, whereby the network element translates the IPv6 formatted data packet with assistance from the CPE and without implementing a domain name server 64 in the network.

2. The method of claim 1, further comprising:

receiving a second IPv4 formatted data packet, having the network element address as a destination address and having been sent from the first device; and translating the second IPv4 formatted data packet into an IPv6 formatted data packet having an IPv6 address of the second device in place of a large scale network address translation (LSN) address as the destination address and having the virtual IPv6 address of the first device as the source address.

3. The method of claim 1, wherein the virtual IPv6 address is a 128 bit address and the RP is at least 64 bits of the 128 bit address.

4. The method of claim 1, wherein the network element and CPE are IPv6 devices on an Internet service provider network.

5. The method of claim 1, further comprising the steps of:

updating a stateful translation table with the private IPv4 address received from the AMR, wherein the stateful translation table is utilized to map private IPv4 addresses with virtual IPv6 addresses.

6. A network element implemented to make an Internet Protocol Version 4 (IPv4) device that uses IPv4 and that is assigned a private IPv4 address accessible to an Internet Protocol Version 6 (IPv6) device that uses IPv6 and that is assigned a regular IPv6 address, wherein a format of the source and destination addresses of IPv4 formatted data packets and IPv6 formatted data packets are different, the network element comprising:

a plurality of ports configured to be coupled to the IPv6 device and coupled to a customer premise equipment (CPE) to which the IPv4 device is connected; and a physical network processor coupled to the plurality of ports and configured to execute a plurality of modules, comprising:

a light network address translation (NAT) module configured to translate IPv6 formatted data packets, which are being sent from the IPv6 device to the IPv4 device and have as their source address the regular IPv6 address, into IPv4 formatted data packets, the light NAT module comprising:

a detection module configured to detect that a virtual IPv6 address including a representation prefix (RP) is used as the destination address of the IPv6 formatted data packets, a communication module configured to discover a correspondence of the virtual IPv6 address with the private IPv4 address through receiving an addressing map query (AMQ) and sending an address map response (AMR) in an exchange with the customer premise equipment (CPE), and a translation module, responsive to the discovered correspondence, configured to generate the IPv4 formatted data packets from the IPv6 formatted data packets, wherein the IPv4 formatted data packets have as their source address an IPv4 address of the network element in place of the IPv6 device's regular IPv6 address and have as their destination address the IPv4 device's private IPv4 address in place of the virtual IPv6 address of the IPv4 device, and wherein the light NAT is further configured to send the IPv4 formatted data packets to the CPE through an IPv4 over IPv6 tunnel for forwarding to the IPv4 device, whereby the light NAT module is capable of translating data packets with assistance from the CPE and without implementing a domain name server 64.

7. The network element of claim 6, wherein:

the light NAT module is further configured to translate second IPv4 formatted data packets, which are being sent from the IPv4 device to the IPv6 device, into second IPv6 formatted data packets, and the translation module is further configured to generate the second IPv6 formatted data packets from the second IPv4 formatted data packets, wherein the second IPv4 formatted data packets have as their destination address an IPv4 address of the network element and have as their source address the IPv4 device's private IPv4 address, and wherein the second IPv6 formatted data packets have as their destination address the IPv6 device's regular IPv6 address in place of an IPv6 address of the network element and have as their source address the IPv4 device's virtual IPv6 address in place of the IPv4 address of the network element.

8. The network element of claim 6, wherein the virtual IPv6 address is a 128 bit address and the RP is at least 64 bits of the 128 bit address.

9. The network element of claim 6, wherein the network element and the CPE are connected through an IPv6 access network of Internet service provider.

10. The network element of claim 6, wherein the translation module updates a stateful translation table with the private IPv4 address received from the AMR, wherein the stateful translation table is utilized to map private IPv4 addresses with virtual IPv6 addresses.

* * * * *

UNITED STATES PATENT AND TRADEMARK OFFICE
CERTIFICATE OF CORRECTION

PATENT NO. : 8,504,722 B2  
APPLICATION NO. : 12/815257  
DATED : August 6, 2013  
INVENTOR(S) : Wassim Haddad Page 1 of 1

It is certified that error appears in the above-identified patent and that said Letters Patent is hereby corrected as shown below:

On the Title Page, in Item [73], under Assignee Name, after "Telefonaktiebolaget L M Ericsson", please insert --(publ)--.

Signed and Sealed this  
Tenth Day of September, 2013

Teresa Stanek Rea  
*Acting Director of the United States Patent and Trademark Office*

UNITED STATES PATENT AND TRADEMARK OFFICE
CERTIFICATE OF CORRECTION

PATENT NO. : 8,504,722 B2
APPLICATION NO. : 12/815257
DATED : August 6, 2013
INVENTOR(S) : Haddad It is certified that error appears in the above-identified patent and that said Letters Patent is hereby corrected as shown below:

Title Page 2, in Item (56), under "OTHER PUBLICATIONS", in Column 1, Line 8, delete "IP Workin" and insert -- IP Working --, therefor.

In the Specification

In Column 3, Line 44, delete "is" and insert -- it is --, therefor.

Signed and Sealed this
Twenty-fourth Day of December, 2013

Margaret A. Focarino
*Commissioner for Patents of the United States Patent and Trademark Office*